(12) United States Patent
Buchholtz et al.

(10) Patent No.: US 10,897,128 B2
(45) Date of Patent: Jan. 19, 2021

(54) ENGAGEMENT TAB ON CABLE FOR CARRIAGE DEVICE WITH A DEFLECTOR

(71) Applicant: Hewlett-Packard Development Company, L.P., Spring, TX (US)

(72) Inventors: Brett Thomas Buchholtz, Vancouver, WA (US); Jonathan Cha Spafford, Vancouver, WA (US); John Marshall, Vancouver, WA (US); Elliott Downing, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/493,715

(22) PCT Filed: Mar. 23, 2017

(86) PCT No.: PCT/US2017/023818
§ 371 (c)(1),
(2) Date: Sep. 12, 2019

(87) PCT Pub. No.: WO2018/174888
PCT Pub. Date: Sep. 27, 2018

(65) Prior Publication Data
US 2020/0036178 A1 Jan. 30, 2020

(51) Int. Cl.
*H02G 11/00* (2006.01)
(52) U.S. Cl.
CPC .................. *H02G 11/00* (2013.01)
(58) Field of Classification Search
CPC ....................................... H02G 11/00
USPC ........................................ 174/135
See application file for complete search history.

(56) References Cited

U.S. PATENT DOCUMENTS

| | | | |
|---|---|---|---|
| 4,999,651 A * | 3/1991 | Duffield | B41J 2/215 347/20 |
| 5,096,316 A | 3/1992 | Otsuka et al. | |
| 5,133,493 A | 7/1992 | Russel et al. | |
| 6,735,415 B2 | 5/2004 | Isobe et al. | |
| 7,969,621 B2 | 6/2011 | Shunji | |
| 8,724,181 B2 | 5/2014 | Fujiwara | |
| 9,344,593 B2 | 5/2016 | Shiomi | |
| 2004/0056926 A1 * | 3/2004 | Samoto | B41J 29/02 347/50 |
| 2016/0325569 A1 * | 11/2016 | Elferink | B41J 25/001 |

FOREIGN PATENT DOCUMENTS

| | | |
|---|---|---|
| FR | 2956885 A1 | 9/2011 |
| JP | H024563 A | 1/1990 |
| JP | 200062284 A | 2/2000 |
| JP | 2009166362 A | 7/2009 |

OTHER PUBLICATIONS

PicoPrint 3D Printer, < https://apollo.open-resource.org/mission:resources:picoprint > 2014 ~ 16 pages.

* cited by examiner

*Primary Examiner* — Sherman Ng
(74) *Attorney, Agent, or Firm* — HP Inc. Patent Department

(57) ABSTRACT

A cable slack controller may include a deflector coupled to a movable carriage device; at least one end of a cable coupled to the carriage device; and an engagement tab formed with the cable wherein the engagement tab engages a notch defined in a portion of a channel on which the movable carriage device translates across.

15 Claims, 5 Drawing Sheets

ENGAGEMENT TAB ON CABLE FOR CARRIAGE DEVICE WITH A DEFLECTOR

BACKGROUND

Cables provide electrical power and signals to components and parts within a device. In some instances, these cables are connected to parts of the device that move: dynamic parts. The cables then have an amount of slack along the length of the cable in order to remain connected to the dynamic part in the device in any or a set of positions of the dynamic part.

BRIEF DESCRIPTION OF THE DRAWINGS

The accompanying drawings illustrate various examples of the principles described herein and are a part of the specification. The illustrated examples are given merely for illustration, and do not limit the scope of the claims.

Figure 1:
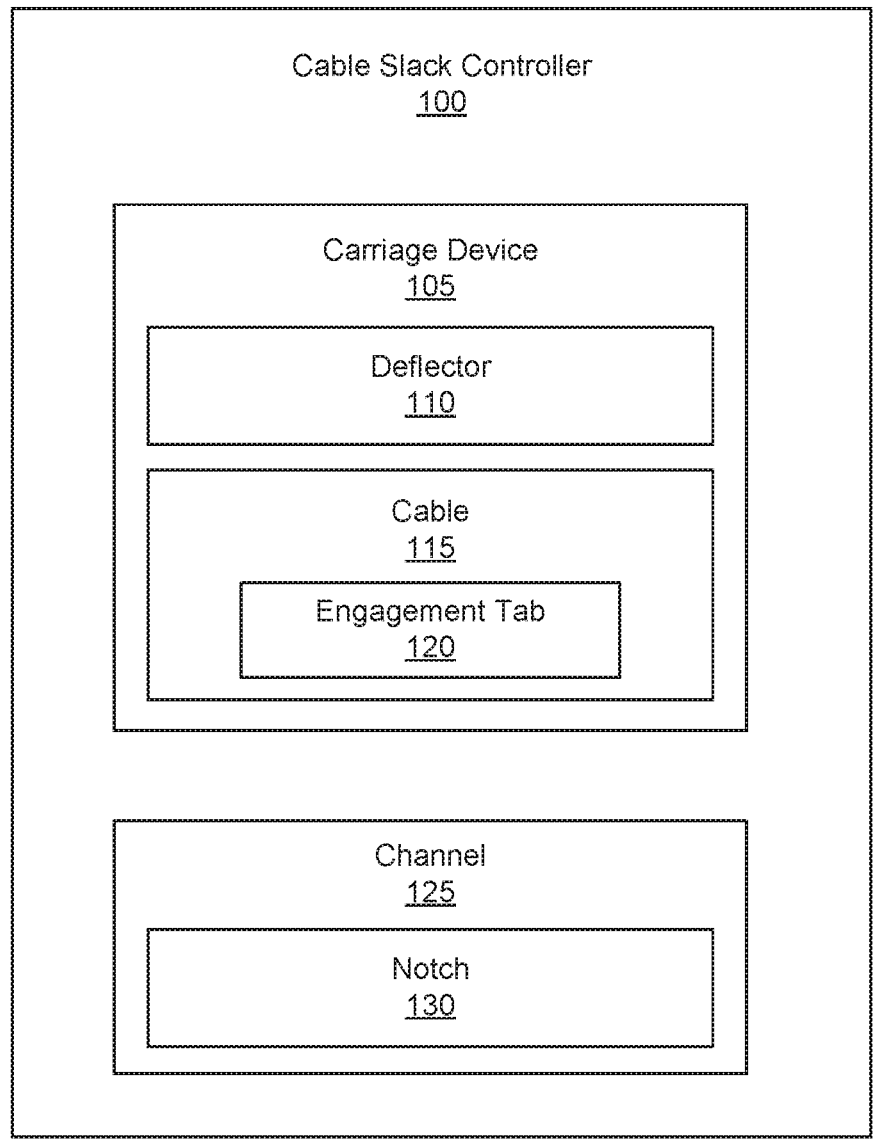
FIG. 1 is a block diagram of a cable slack controller according to an example of the principles described herein.

Throughout the drawings, identical reference numbers designate similar, but not necessarily identical, elements. The figures are not necessarily to scale; and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, certain dynamic parts such as a movable carriage device within a device may be connected, at least, to an electrical source by a cable. The electrical source provides power to the dynamic part and may also provide power to a motor on the dynamic part in order to move the dynamic part in the device from one location to another. In order to remain connected to the power source, the cable may be long enough to remain connected to the dynamic part as the dynamic part is at a maximum distance.

In some instances, the dynamic part may progress along a set path within the device. In this example, the cable may be placed in a channel to accommodate the movement of the dynamic part. However, as the dynamic part passes over the cable, the slack produced in the movement of the dynamic part may impede the progress of the dynamic part by bunching up, looping, or otherwise bending in front of the dynamic part as it moves along the set path. This may cause damage to the cable as the part passes over the cable. Cuts in the cable will lead to, at least, the cable failing; loss in functionality of the dynamic part, and loss in functionality to the device the part operates within.

The present specification describes a cable slack controller that includes a deflector coupled to a movable carriage device; at least one end of a cable coupled to the carriage device; and an engagement tab formed with the cable wherein the engagement tab engages a notch defined in a portion of a channel on which the movable carriage device translates across.

The present specification further describes an electrical carriage device, including a deflector coupled to a bottom surface of the carriage device; an electrical cable including an engagement tab perpendicularly formed with the electrical cable and extending out from at least one side of the electrical cable; and wherein the engagement tab engages a notch defined in a channel on which the carriage device translates across to prevent the electrical cable from bending in front of the direction of translation of the carriage device; and wherein the deflector deflects the electrical cable towards the channel when the carriage device translates across the channel.

The present specification also describes a system including a carriage track; a movable carriage device translatively coupled to the carriage track; and a cable electrically coupled to the movable carriage device, wherein the cable comprises an engagement tab coupled to the cable, the engagement tab to engage with a slot defined in a portion of the carriage track.

Examples described herein provide for cable management of a dynamic part such as a movable carriage device. The cable is managed via the coupling of a deflector to the movable carriage, the defining of a notch in a rail of a channel over which the movable carriage moves, the coupling of a tab to the cable that fits within the notch, or combinations thereof.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

FIG. 1 is a block diagram of a cable slack controller (100) according to an example of the principles described herein. The cable slack controller (100) may include a carriage device (105) and a channel (125) that the carriage device (105) travels across.

The carriage device (105) may include a deflector (110) and a cable (115) having an engagement tab (120) formed therewith. The channel (125) may include a notch (130) defined therein to engagement with the engagement tab (120).

The carriage device (105) may be any type of device that is electrically driven, at least in part, by the cable (115). The carriage device (105) may, therefore, include a cable connector that couples a first end of the cable (115) to the carriage device (105). As second end of the cable (115) may be coupled to another portion of an electrical device the carriage device (105) has been made a part of. For ease of explanation, the carriage device (105) may be described herein as being a stapling device located within, for example, a copying or printing device. In this example, the carriage device (105) may be transported along a channel into which the cable (115) may be placed when the carriage device (105) is furthest away from the second end of the cable (115).

The cable (115) may be any type of cable. In an example, the cable (115) is any cable that provides electrical signals from, for example, a processor, electrical power to the carriage device (105), electrical power to a motor associated with the carriage device (105), or combinations thereof. In an example, the cable (115) may, therefore, be any type of cable that can transfer both electrical power and signals used to operate the carriage device (105). In an example, the cable (115) is a flexible flat cable (FFC).

The deflector (110) may be coupled to the carriage device (105) such that the deflector (110) deflects the cable (115) into the channel (125) as the carriage device (105) passes along the channel (125). The deflector (110) may include a beveled edge along a direction of travel of the carriage device (105). The beveled edge causes any portion of the cable (115) to slip below the carriage device (105) and deflector (110) without damaging the cable (115). The distance between a bottom surface of the channel (125) and the deflector (110) may be between 3 and 5 millimeters thereby directing the cable (115) in the channel (125) as the carriage device (105) passes along the channel (125).

The cable (115) further includes an engagement tab (120) formed with the cable (115). The engagement tab (120) may extend out from an edge of the cable (115). The engagement tab (120) may be made of a polymer or polyimide such as polyester. In an example, the engagement tab (120) is coupled to the cable (115) using a fastener such as double sided tape, glue, or other type of adhesive. In an example, the engagement tab (120) may be sandwiched into a layer of the cable (115) during the manufacturing of the cable (115). In an example, the engagement tab (120) may be formed out of a layer of material that the cable (115) is made of. In any of the examples, the engagement tab (120) may be made of a resilient material that may have a force applied to it without the engagement tab (120) bending or breaking. In the example where the cable (115) is a FFC, the length of the engagement tab (120) may be equal or less than the width of the FCC. In this example, the coupling of the engagement tab (120) to the cable (115) may be strengthened if the engagement tab (120) were longer thereby allowing additional adhesive contact between the engagement tab (120) and the cable (115).

The engagement tab (120) may interface with a notch (130) defined in the channel (125). In an example, the channel (125) may include a number of rails that define the inner surfaces of the channel (125). Because the engagement tab (120) extends out from an edge of the cable (115), the notch (130) may be formed in the rail matching the side of the cable (115) that the engagement tab (120) extends from. During operation of the carriage device (105) and while the carriage device (105) is in a "home position," the engagement tab (120) may sit within the notch (130) defined in the rail of the channel (125). As the carriage device (105) moves away from the "home position," the deflector (110) and engagement tab (120)/notch (130) prevent the cable (115) from bending, looping, or otherwise extending in front of the carriage device (105). The deflector (110), in an example, may apply a resistive force against the cable (115) and its engagement tab (120) causing the engagement tab (120) to remain in the notch (130). Additionally, the cable (115) may be allowed to move slightly in the direction of the movement of the carriage device (105) but will be stopped by the engagement tab (120) being forced against a wall of the notch (130). This may further prevent any additional movement of the cable (115) in the direction of travel of the carriage device (105). As the carriage device (105) passes over and past the engagement tab (120) and notch (130), the engagement tab (120) may be lifted out of the notch (130) as the cable (115) is pulled from a trailing end of the carriage device (105), As the carriage device (105) returns back to the "home position," the cable is laid down into the channel (125), the engagement tab (120) is laid into the notch (130), and any slack in the cable (115) is reduced.

Figure 2:
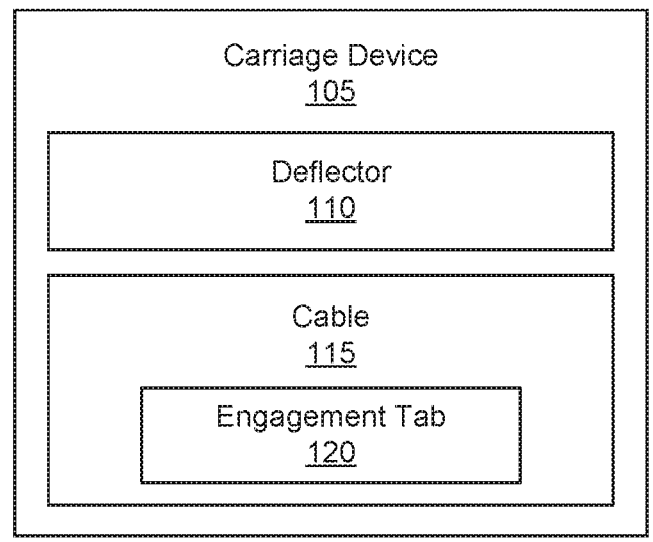
FIG. 2 is a block diagram of a carriage device (105) according to an example of the principles described herein.

FIG. 2 is a block diagram of a carriage device (105) according to an example of the principles described herein. As described above in connection with FIG. 1, the carriage device (105) may include a deflector (110) and a cable (115) including the engagement tab (120). Similar functions and properties of the carriage device (105) may include a deflector (110) and a cable (115) including the engagement tab (120) may be present in those elements represented in FIG. 2 as represented in FIG. 1.

As briefly mentioned above, the carriage device (105) may be any type of device that is coupled, at a first end, to a cable (115) and moves relative to a second end of the cable (115). Thus, the carriage device (105) may be any moveable part of a larger device that moves within the larger device. Examples of carriage devices (105) may include a stapler in a copier or multi-functional printing device (MFP), a print head within a printing device, a hole puncher within a copying machine, a cutting device within an industrial manufacturing machine, among others. Although, some examples herein are described in terms of a stapling device within, for example, a copying machine, these other types of carriage devices (105) are contemplated.

Figure 3:
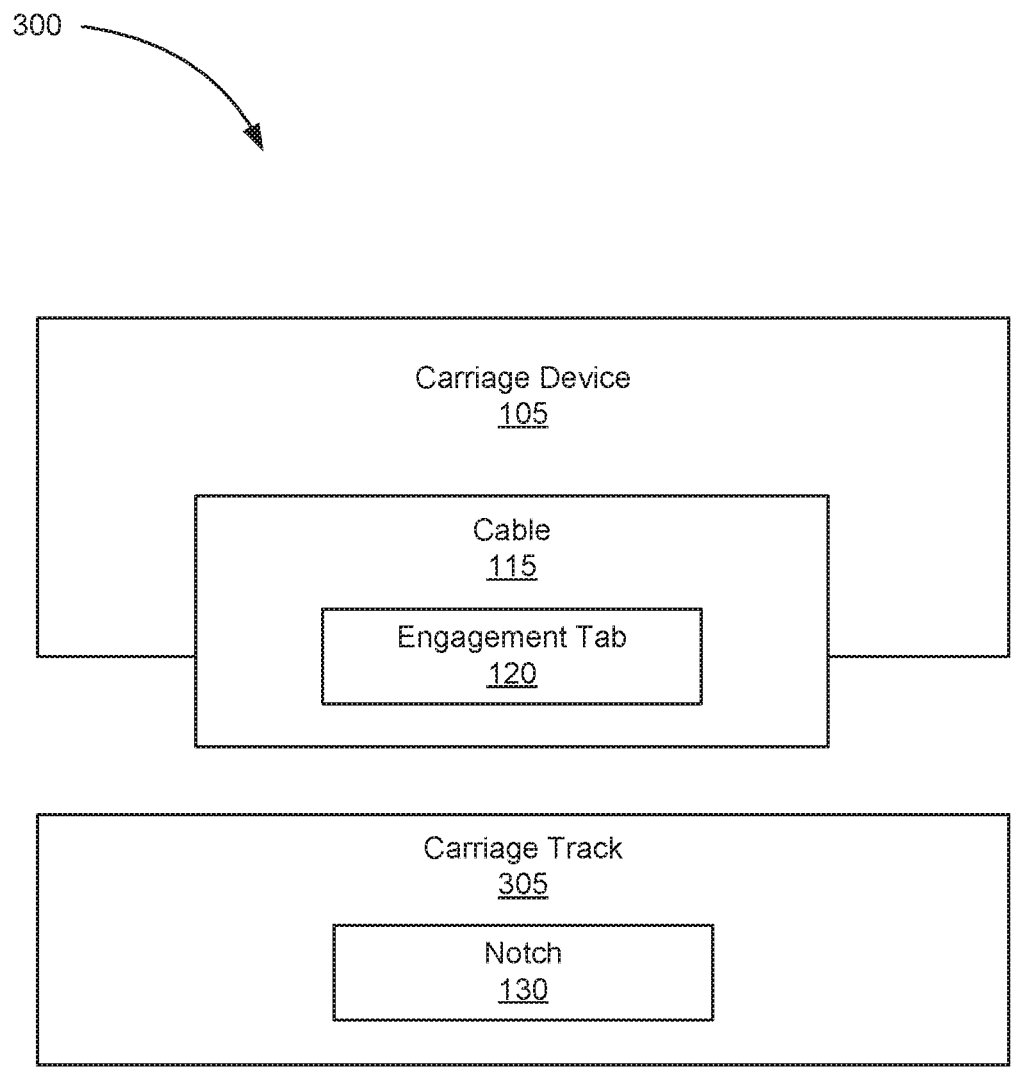
FIG. 3 is a block diagram of a system incorporating the engagement tab shown in FIG. 2 according to the examples described herein.

FIG. 3 is a block diagram of a system (300) incorporating the engagement tab shown in FIG. 2 according to the examples described herein. FIG. 3 shows a carriage device (105) as described here as well as the cable (115) and its engagement tab (120). FIG. 3 further shows a carriage track (305) the carriage device (105) translates across. In some examples the carriage track (305) includes the channel (125) described herein as well as leads or guides that guide the carriage device (105) along the carriage track (305). In an example, the guides may include a flat surface that prevents the carriage device (105) from being removed from off of the surface of the carriage track (305). The carriage track (305) may further comprise a number of rails as described herein that have a notch (130) defined therein to receive the engagement tab (120) of the cable (115).

The carriage track (305), in an example, may further include a number of gear teeth that engage a gear mechanism of a motor included on the carriage device (105). As briefly mentioned herein, the carriage device (105) may include its own motor that drives the carriage device (105) along the carriage track (305). The motor may be directed by signals sent via the cable (115) to turn a gear mechanism coupled to the motor thereby causing the carriage device (105) to move along the carriage track (305). Other mechanical devices may be used to translate the carriage device (105) along the carriage track (305) and the present specification contemplates the use of those other mechanical devices.

Figure 4A:
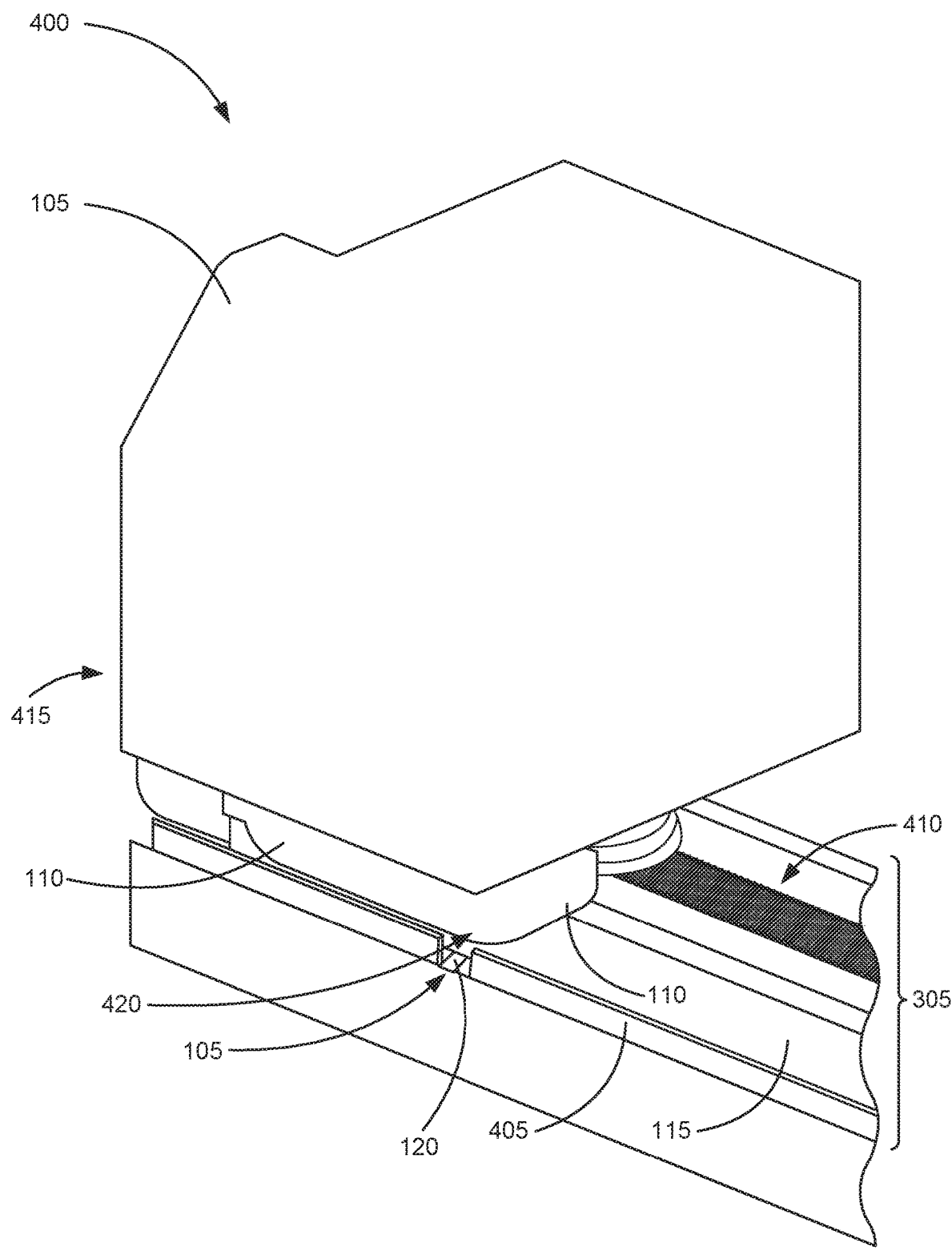
FIGS. 4A and 4B are perspective views of a system for controlling cable slack in a cable according to an example of the principles described herein.
Figure 4B:
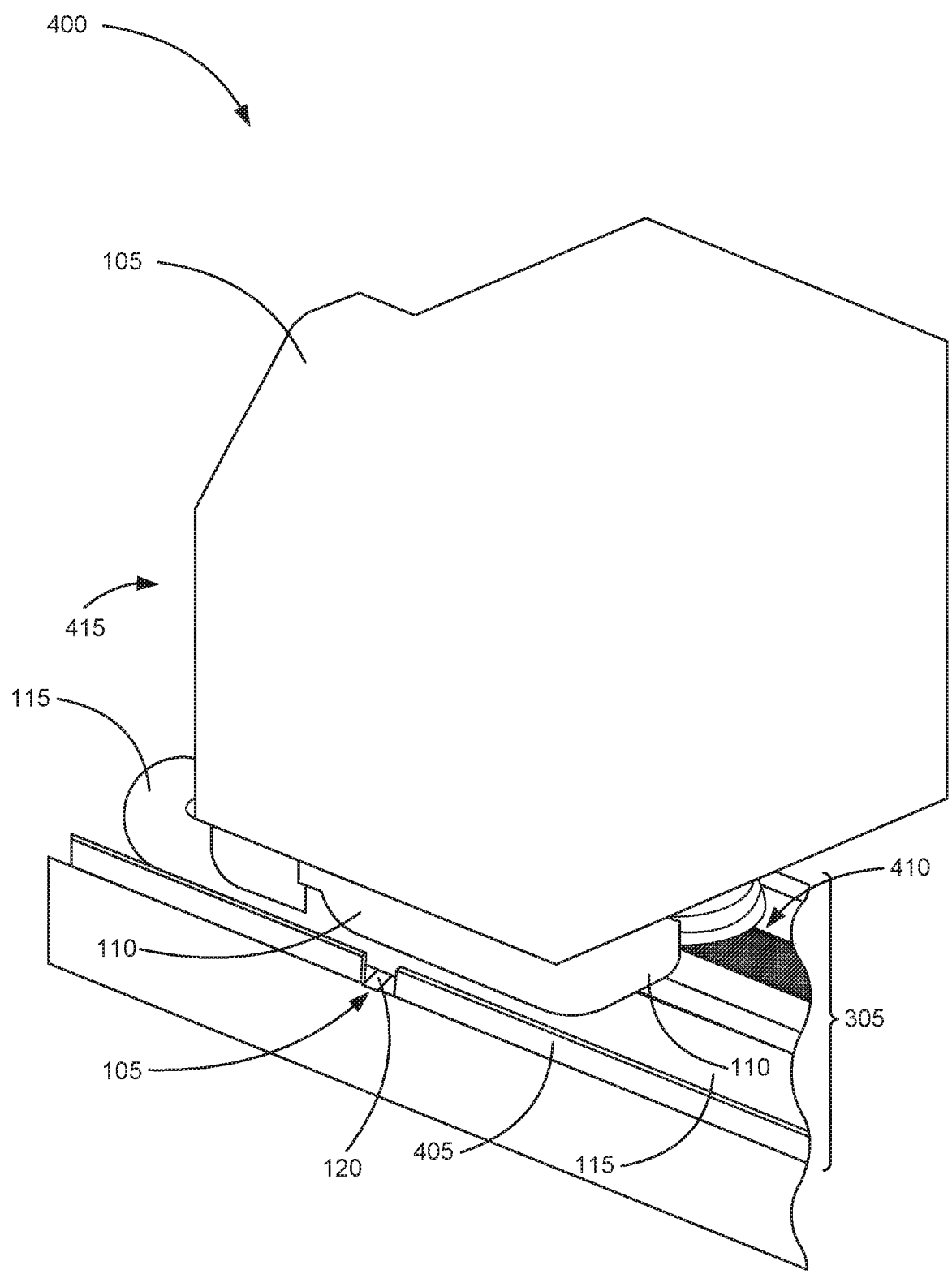

FIGS. 4A and 4B are perspective views of a system (400) for controlling cable slack in a cable (115) according to an example of the principles described herein. FIG. 4A shows the carriage device (105) in a "home position" along the carriage track (305) while FIG. 4B shows the carriage device (105) and a position while translating along the carriage track (305).

The system (400) includes a carriage device (105) mechanically coupled to a carriage track (305) as descried above in connection with FIG. 3. FIG. 4, further shows a cable (115) laying within the channel (125) while the carriage device (105) is in the "home position." In this position, no slack is present in the cable (115) because the cable (115) is extended to its maximum length. The cable (115) is coupled electrically to a back side (415) of the carriage device (105), wraps below the carriage device (105), and is strung along the entire length of the channel (125) while the carriage device (105) is in the "home position."

As can be seen in FIGS. 4A and 4B, the deflector (110) is deflecting the cable (115) into the channel (125) while the carriage device (105) is in the "home position." In this example, the deflector (110) is also, by the force of the deflector (110), pushing and maintaining the engagement tab (120) into the notch (130) defined in the rail (405) if the carriage track (305).

During operation, the carriage device (105) may be sent an electrical signal via the cable (115) indicating that the motor of the carriage device (105) is to activate and cause the carriage device (105) to translate along the channel (125) in order to position the carriage device (105) in a certain position along the carriage track (305). The cable (115) provides the power to the motor which, in turn, engages a gear mechanism with teeth (410) defined on the carriage track (305) thereby causing the movement of the carriage device (105). As the carriage device (105) translates along the carriage track (305), the cable (115) begins to form a loop at the back side (415) of the carriage device (105). This is due to the deflector (110) deflecting the cable (115) into the channel (125) and the notch (130) preventing the cable (115) from sliding within the channel (125) via the engagement tab (120) engaging with the notch (130).

As the deflector (110) moves relatively further along the channel (125), the portion of the cable (115) to which the engagement tab (120) is coupled also forms part of the loop. Because the deflector (110) has a beveled edge (420), the cable (115) may slide more easily below the deflector (110) preventing damage to the cable (115). This occurs along the entire length of the carriage track (305) as the deflector (110) is moved along the length of the cable (115) by the carriage device (105).

Aspects of the present system and methods are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, a processor associated with an electrical device associated with the carriage device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a carriage device that includes a deflector and is coupled to a cable that includes an engagement tab. The deflector and engagement tab prevent the cable from bending or accumulating in front of the carriage device while the carriage device is translated along a carriage track. This prevents the cable from being damaged if the carriage device were to bend or run over the cable. As a consequence, the cable itself may be a relatively less expensive cable because the cable may not include additional layers or types of layers that protect the cable from damage. Additionally, because the carriage device can safely traverse over the cable during operation, the distance from the carriage device/deflector and the cable may be reduced thereby decreasing the size of the entire system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A cable slack controller, comprising:
   a deflector coupled to a movable carriage device;
   at least one end of a cable coupled to the carriage device; and
   an engagement tab formed with the cable;
   wherein the engagement tab engages a notch defined in a portion of a channel on which the movable carriage device translates across.

2. The cable slack controller of claim 1, wherein the cable is a flexible flat cable.

3. The cable slack controller of claim 1, wherein the engagement tab prevents movement of the cable in a direction of travel of the movable carriage device.

4. The cable slack controller of claim 1, wherein the engagement tab forces the cable to loop behind the movable carriage device opposite a direction of travel of the movable carriage device.

5. The cable slack controller of claim 1, wherein the engagement tab is made of polyethylene terephthalate (PET).

6. The cable slack controller of claim 1, wherein the engagement tab extends the entire length of the cable perpendicular to the cable.

7. The cable slack controller of claim 1, wherein the deflector forces the cable into the channel as the carriage device translates across the channel.

8. The cable slack controller of claim 1, wherein the notch is defined in a rail of the channel.

9. An electrical carriage device, comprising:
   a deflector coupled to a bottom surface of the carriage device;
   an electrical cable comprising an engagement tab perpendicularly formed with the electrical cable and extending out from at least one side of the electrical cable; and
   wherein the engagement tab engages a notch defined in a channel on which the carriage device translates across to prevent the electrical cable from bending in front of the direction of translation of the carriage device; and
   wherein the deflector deflects the electrical cable towards the channel when the carriage device translates across the channel.

10. The electrical carriage device of claim 9; wherein the channel comprises a rail and wherein the notch is defined in the rail.

11. The electrical carriage device of claim 9, wherein the deflector comprises a beveled edge to deflect the electrical cable towards the channel when the carriage device translates across the channel.

12. The electrical carriage device of claim 9; wherein the engagement tab is formed into a layer of the electrical cable.

13. The electrical carriage device of claim 9, wherein the engagement tab is coupled to an exterior surface of the electrical cable.

14. A system comprising:
- a carriage track;
- a movable carriage device translatively coupled to the carriage track; and
- a cable electrically coupled to the movable carriage device, wherein the cable comprises an engagement tab coupled to the cable, the engagement tab to engage with a notch defined in a portion of the carriage track.

15. The system of claim 14, further comprising a deflector coupled to the movable carriage device to deflect the cable between the deflector and the carriage track.

\* \* \* \* \*